United States Patent [19]

Sachetto et al.

[11] 4,297,137

[45] Oct. 27, 1981

[54] ANTI-FOULING PAINT

[75] Inventors: Jean-Pierre Sachetto, Saint-Julien-en-Genevois, France; Sergio Cuccolo, Geneva, Switzerland

[73] Assignee: Centre National pour l'Exploitation des Oceans, Paris, France

[21] Appl. No.: 161,242

[22] Filed: Jun. 20, 1980

Related U.S. Application Data

[63] Continuation of Ser. No. 885,850, Mar. 13, 1978, abandoned.

[30] Foreign Application Priority Data

Mar. 15, 1977 [FR] France ............................... 77 07626

[51] Int. Cl.$^3$ .............................................. C09D 5/14
[52] U.S. Cl. .................................. 106/15.05; 106/137; 106/168; 424/141; 424/288
[58] Field of Search ..................... 106/15.05, 168, 124, 106/137; 424/288, 141

[56] References Cited

U.S. PATENT DOCUMENTS 3,779,957 12/1973 Jassiliades et al. ................... 106/296
3,851,053 11/1974 Cardarelli ............................. 424/78
4,042,402 8/1977 Drake et al. ...................... 106/15.05

FOREIGN PATENT DOCUMENTS 2155166 5/1973 France.

Primary Examiner—Lorenzo B. Hayes
Attorney, Agent, or Firm—Alan H. Levine

[57] ABSTRACT

The invention relates to anti-fouling paints and is concerned with anti-fouling paints developed for inhibiting the fixation of marine organisms on structures which are immersed in sea water, the paints including at least one toxic substance uniformly incorporated into a discontinuous solid matrix which is insoluble in sea water and is dispersed in the paint, the matrix being at least partially formed from at least one substance which becomes soluble in sea water under the action of enzymes liberated by the marine organisms to be inhibited and/or by the bacterial film in contact with the surface of the paint.

The paints according to the invention provide an effective life which is much longer than that of the known anti-fouling paints.

The invention relates to an anti-fouling paint containing at least one toxic substance.

5 Claims, No Drawings

ANTI-FOULING PAINT

This application is a continuation of application Ser. No. 885,850, filed Mar. 13, 1978, now abandoned.

BACKGROUND OF INVENTION

As is known, an anti-fouling paint is one which is intended to be applied to the hulls of ships or to the surface of any other immersed object, usually on to a coating of rust-resistant paint, and the purpose of which is to prevent or minimise the fixation of certain marine flora and fauna, for example algae, shellfish, mulluses and corals on to the hull or surface.

Several types of anti-fouling paints are known.

Certain anti-fouling paints operate by exfoliation, i.e. by flaking from the substrate and thereby carrying away the marine organisms attached to the surface of the paint.

However, most of the anti-fouling paints operate by progressive liberation of toxic substances, the purpose of which is to destroy the marine organisms coming into contact with the hull or at least to inhibit the fixation thereof on the hull.

In this last type of anti-fouling paint, the liberation of the toxic substance results from the leaching out or release of this substance by the sea water, this being a phenomenon which is produced just as well when the ship is moving as when it is stationary. Certain toxic pigments, such as cuprous oxide, even have a higher leaching out speed when the ship is in motion than when it is stationary.

Now the tendency for the fauling media to become fixed only exists in practice when the hull is stationary in relation to the surrounding mass of water. It is thus pointless for the toxic substance to be liberated while the ship is moving, sine this results in a waste of the toxic substance and a premature loss of efficiency of the anti-fouling paint.

With the object of prolonging the effective duration of an anti-fouling paint, it has been proposed in French Pat. No. 2,155,166 to seal the toxic product inside microcapsules which have a water-soluble casing formed by a substance selected from the group comprising gelatine, nitrocellulose and methylcellulose, the diameter of the capsule being from 5 to 30microns and the thickness of its casing being from 3 to 10 microns, these microcapsules being dispersed in a proportion which is between 5 and 25% in the binding agent or vehicle of the paint.

According to this patent, the liberation of the toxic product as thus sealed in the microcapsule can take place by various procedures, namely, either by osmosis through the wall, or by dissolution of the said wall, or by bursting of the wall under the action of a blowing agent or under the mechanical action produced by brushing.

In order to regulate the release of the toxic product in time, thereby stabilising its diffusion, it is mentioned in the same patent that it is possible for the toxic agent to be incorporated into the microcapsule in admixture with a resin having the property of polymerising under the action of humidity.

The process described in the afornentioned patent enables the speed of release of the toxic substance to be slowed down or regulated to a certain degree, but it does not however prevent entirely the leaching out of the substance while the ship is under way.

OBJECT OF THE INVENTION

The object of the present invention is specifically to provide an anti-fouling paint which only releases the toxic substance in the presence of the marine organisms which it is desired to inhibit.

SUMMARY OF THE INVENTION

The anti-fouling paint according to the invention is characterised in that the toxic substance is incorporated uniformly in a discontinuous solid matrix is insoluble in sea water and is dispersed in the paint, this matrix being at least partly formed by at least one substance which becomes soluble in sea water under the effect of enzymes liberated by the marine organisms to be inhibited and/or by the bacterial film in contact with the surface of the paint.

Thus, in the anti-fouling paint according to the invention, the toxic substance is not sealed inside microcapsules, as in the case which is described in the aforementioned French patent, but is homogeneously incorporated in a solid matrix of which it forms an integral part. As a consequence, instead of the toxic substance being liberated suddenly the wall of the microcapsule has been dissolved or broken, as is the case with the aforementioned French patent, the toxic substance in the paint of the present invention is liberated gradually as the matrix in which it is incorporated becomes dissolved.

However, since this matrix is formed by a solid substance which is only made soluble in sea water under the action of enzymes liberated by the marine organisms which it is desired to inhibit, or by the bacterial film in contact with the surface of the paint; the dissolving of the matrix, and the simultaneous release of the toxic substance which flows gently therefrom, are produced only when this is necessary, i.e. in the presence of the said marine organisms and/or the said bacterial film, i.e. when the speed of movement of the substrate relatively to the sea is zero or is at least sufficiently low for the organisms to become fixed to the said substrate. The marine organisms may thus be the cause of their own destruction.

The solubilisation of the matrix which contains the toxic substance may also be caused by enzymes liberated by the bacterial film in contact with the surface of the anti-fouling paint.

As is known, such a bacterial film is formed by a flora of microorganisms which proliferate in the liquid layer which is in the immediate vicinity of the surface of the immersed body, that is to say, in a layer having a thickness of the order of a few microns.

The presence of this bacterial film contributes to a large degree to the fixation of the vegetable or animal fouling media on the surface of the immersed body, because this film constitutes a probably nutritive media for the fouling media, which as a consequence have a tendency to be drawn towards it.

For this reason, the destruction of the bacterial film as a consequence of the liberation of a toxic substance by the anti-fouling paint, also contributes to the inhibition of the fixation of the fouling media.

On the other hand, the triggering of the mechanism for liberating the toxic substance under the action of enzymes originating from the bacterial film results in the inhibition of the fixation of other marine organisms which would, in themselves, be incapable of liberating enzymes having an action for making the matrix soluble, this seeming to be, for example, the case with certain algae.

It is probable that the liberation of the toxic substance by the anti-fouling paint in accordance with the invention results, in practice, from the combination of the action of enzymes originating from the organisms which it is desired to inhibit and the action of enzymes originating from the bacterial film.

Consequently, the invention permits a best possible utilisation of the toxic substance contained in the anti-fouling paint, resulting in a considerable increase in the time during which this paint is effective under normal operating conditions (i.e. in the case where the substrate covered by the anti-fouling paint is subjected to a normal alternation of periods during which the marine organisms have a tendency to become fixed on the substrate, as when a ship is stationary in a port, and periods during which this tendency does not exist or is not very considerable, such as when a ship or vessel is travelling at high speed).

As toxic substance, it is possible to use any appropriate substance, especially toxic pigments, such as cuprous oxide ($Cu_2O$), monomeric or polymeric organometallic derivatives of tin, such as tributyl-tin oxide (TBTO), tributyl-tin acetate (TBTA), tributyl-tin fluoride (TBTF), etc.

Bearing in mind that the marine organisms which it is desired to inhibit are: herbivorous organisms such as the shellfish, oysters and mussels, which secrete enzymes capable of degrading the polysaccharides: cellulases, alginases; carnivorous organisms such as whales, which secrete enzymes capable of degrading proteins: proteases, esterases; omnivorous organisms, such as the ascidiae, bryozoae, small-size whales, serpulae, which secrete all the previously indicated enzymes; and that the bacterial film close to the immersed body is formed essentially by microorganisms which excrete cellulases, amylases, proteases and esterases, it is easily possible to determine the type of matrix which can be used. Thus, the matrix which is used in the paints according to the present invention preferably includes at least one biodegradable compound which is insoluble or has little solubility in sea water, selected from: proteins, polysaccharides, polyesters, polyurethanes, celluloses and their derivatives and particularly the gels of regenerated cellulose and the gels of proteins, such as coagulated albumin.

Preferably, the solid matrix in which the toxic substance is incorporated is in the form of fine powder particles which are obtained, for example, by grinding particles or granules of larger dimensions or a single compact mass. Preferably, the maximum grain size of this fine powder is 100 microns.

As substance for forming the matrix, it is, for example, possible to use a regenerated celllose gel or a coagulated protein gel.

The proportion of solid matrix containing the toxic substance in the paint, as well as the final content of toxic substance in the paint film, are dependent on the nature of the matrix and also on the nature of the toxic substance.

Generally speaking, the mixture of matrix and toxic substance contains from 5 to 50% by weight of toxic substance; the proportion of matrix and toxic substance together is generally from 20 to 60 parts by weight to 100 parts by weight of paint, solvent included.

For example, in the case where the solid matrix is formed from an albumina gel and where the toxic substance is tributyl-tin fluoride (TBTF), the optimal proportion of albumina gel in the paint is between 20 and 60% by weight, relative to the total weight of the paint, and the optimal content of TBTF in the film of paint obtained after the paint has been applied to a substrate and the film has dried, is between 10 and 30% by weight, relative to the weight of the film of dry paint.

The compositions for anti-fouling paints are known to the person skilled in the art and they are generally formed by:

| | |
|---|---|
| film-forming resin (Vinylite Vyhh) | 5–20% |
| pore-forming resin (Colophony) | 5–20% |
| plasticiser (tricresylphosphate) | 2–8% |
| methyl isobutylketone solvent | 40–70% |
| xylene | 0–30% |

It is quite obvious that it is possible in these paints to use other insoluble film-forming resins of the vinyl, alkyd, urethane, acrylonitrile, acrylate, epoxy and chlorinated elastomer type.

It is also possible to employ other pore-forming agents, such as the soluble polymers:
polyvinyl alcohol
polyacrylamides
polyacrylic and polymethacrylic acids
cellulose derivatives (methyl cellulose, hydroxymethyl cellulose, hydroxypropyl cellulose)
oxides of polyethylene and polyethylene imines
polyvinyl pyrrolidone;
or biodegradable polymers such as:
starch derivatives
aliphatic polyester resins
hydrolysable polyurethanes.

Certain plasticisers may also act as pore-forming agents, for example, the esters of fatty acids.

It is to be noted that, in addition to the aforementioned advantage of having a long period of action, the anti-fouling paint according to the invention provides the addition advantage of limiting to a large degree the danger of intoxication of persons storing, handling and applying the paint, due to the fact that the toxic substance is not in its free state, but is incorporated into a matrix.

The invention is further illustrated by the following non-limiting Examples:

EXAMPLE 1

(a) Preparation of filled microspheres of coagulated albumin gel containing particles of cuprous oxide powder ($Cu_2O$) in the form of a homogeneous dispersion Into a three-necked 1-liter spherical flask equipped with a glass mechanical stirrer were introduced 900 milliliters of vaseline (FH; Swiss pharmacopeia), i.e. 730 grams.

Thereafter, the vaseline had progressively dispersed therein, while stirring and at ambient temperature, a mixture of an aqueous 15% by weight albumin solution and cuprous oxide ($Cu_2O$) as a fine powder (wetted prior to mixing with the albumin solution), the proportion of cuprcus oxide in this mixture being 2% by weight, based on the weight of the albumin solution.

Globules of albumin containing the cuprous oxide powder were formed within the vaseline mass at ambient temperature.

The temperature of the contents of the flask was then slowly and progressively raised to 120° C., while stirring vigorously. As soon as this temperature had been reached (the albumin globules are then transformed into solid microspheres of coagulated albumin gel), the heating was stopped and the temperature of the contents of the spherical flask allowed to fall to 40° C., while stirring.

Stirring was then stopped, the microspheres of albumin gel were separated from the vaseline by decantation and then carefully washed with petroleum ether, and then with acetone (this alternate washing procedure was repeated three times) and, finally, with ethyl ether.

In this way, microspheres of coagulated albumin gel were obtained, forming a solid matrix containing fine powder particles of cuprous oxide dispersed homogeneously in the said matrix. The diameter of the said microspheres was slightly smaller than 100 microns.

(b) Preparation of an anti-fouling paint

The microspheres were then crushed so as to reduce them to a fine powder, which was washed with acetone and then with methanol, and finally with ether. After this operation, the powder thus obtained was dried and homogeneously dispersed in a paint composition (mixture of vehicle diluent and solvent which also contains tricresyl phosphate) having the following composition: (as percentages by weight):

| | |
|---|---|
| vinylic film-forming synthetic resin (Vinylite Vyhh*) | 12.30 |
| colophony resin | 12.30 |
| tricresyl phosphate | 4.60 |
| methyl isobutyl ketone | 42.30 |
| xylene | 28.50 |

*Vinylite Vyhh: product manufactured by Union Carbide, (vinyl chloride - vinyl acetate copolymer having a mean molecular weight).

The coagulated albumin gel is added to the composition in an amount of 40% by weight, based on the weight of the paint composition.

In this way, an anti-fouling paint is obtained which leads to the release of the toxic pigment (cuprous oxide) in the presence of marine, vegetable or animal organisms; which excrete at least one proteolytic enzyme, such as trypsin, capable of solubilising the particles of coagulated albumin gel covering the toxic pigment.

The release ceases in the absence of enzyme, and starts again as soon as the enzyme is once again present.

EXAMPLE 2

(a) Preparation of a coagulated albumin gel containing tributyl-tin oxide (TBTO) as toxic substance 12 volumes of an aqueous solution of albumin (with 15% by weight of albumin) were mixed while stirring and at ambient temperature with 4 volumes of a solution of tributyl-tin oxide in methanol (containing about 1000 g of TBTO per liter of methanol). A voluminous precipitate of partially coagulated albumin gel was formed, and this was heated to 70° C. so that it completely coagulated. The coagulated albumin gel thus obtained contained in uniformly dispersed form a quantity of TBTO corresponding to half the total weight of albumin plus TBTO.

(b) Preparation of an anti-fouling paint

The coagulated albumin gel obtained as described above was reduced to a fine powder and homogeneously incorporated into a paint composition which was identical with that described in Example 1, at the rate of 50% by weight of albumin gel based on the weight of the paint composition.

In this way, an anti-fouling paint was obtained which included a total quantity of 31.55% by weight of tributyl-tin oxide (TBTO) in a paint film formed on a substrate.

This film contained 22.68% by weight of TBTO (relatively to the total weight of the film after the latter has been dried at 50° C., under vacuum), incorporated into the coagulated albumin gel, the remainder being in a free form.

The toxic product (TBTO) incorporated into the coagulated albumin gel was released in the presence of marine organisms which excrete proteolytic enzymes.

EXAMPLE 3

As described in Example 2, a paint was produced with only 12% by weight of albumin gel incorporated into the paint composition.

The anti-fouling paint film contained a total quantity of 14.66% by weight of TBTO, the content of TBTO incorporated in the albumin gel being 11% by weight, based on the total weight of the dry paint film (after drying under vacuum at 50° C.).

EXAMPLE 4

As Example 2, but using tributyl-tin acetate (TBTA) as toxic substance.

Proportion of albumin gel incorporated into the paint composition: 64% by weight.

Total quantity of TBTA in the paint film immediately after formulation: 34.32% by weight.

Quantity of TBTA incorporated into the albumin gel (content of TBTA in the film after drying at 50° C. under vacuum): 17.74% by weight.

EXAMPLE 5

As Example 4, but with the following proportions of TBTA:

Proportion of albumin gel incorporated into the paint composition: 24% by weight.

Total quantity of TBTA in the paint film immediately after formation: 22.66% by weight.

Quantity of TBTA incorporated into the albumin gel (content of TBTA in the film after drying at 50° C. under vacuum): 11.71% by weight.

Plates or sheets of polyvinyl chloride, coated on one face with films of anti-fouling paints prepared as indicated in Examples 2 to 5 were kept immersed for 100 days in the sea, during Summer months, in a temperate region (the Brest Roads, France), as a test for the effectiveness of these paints.

Prior to the tests, the paint films were subjected to drying under vacuum, at 50° C., so as to eliminate the fraction of organic tin derivative not incorporated into the matrix of coagulated albumin gel.

After the test, the surface of the polyvinyl chloride sheets covered with the films of anti-fouling paint were completely free from any traces of fouling, whereas the opposite faces, not covered with anti-fouling paint, were on the contrary heavily loaded with fouling media (essentially shellfish), which were solidly fixed on the surface of the said sheet.

The following table sets out the results of this test.

| Test sample | Ex. 4 | Ex. 5 | Ex. 2 | Ex. 3 |
|---|---|---|---|---|
| % albumin gel + organo-tin in the paint | 64 | 24 | 50 | 12 |
| Albumin organo-tin ratio | 1/1 | 1/1 | 1/1 | 1/1 |

-continued

| Test sample | Ex. 4 | Ex. 5 | Ex. 2 | Ex. 3 |
| --- | --- | --- | --- | --- |
| Before tests | | | | |
| Weight of paint (g/m$^2$) | 116 | 38 | 100 | 50 |
| % of tin | 6.04 | 3.98 | 9.44 | 4.38 |
| Weight of tin (g/m$^2$) | 7 | 1.51 | 9.44 | 2.19 |
| After tests | | | | |
| Weight of paint (g/m$^2$) | 38.2 | 24.8 | 22.2 | 28.9 |
| % of tin | 2.1 | 2.46 | 2.33 | 1.73 |
| Weight of tin (g/m$^2$) | 0.8 | 0.61 | 0.51 | 0.49 |
| Total tin loss (g/m$^2$) | 6.2 | 0.90 | 8.93 | 1.7 |
| Tin loss in $\mu$g/cm$^2$/day | 6.2 | 0.90 | 8.93 | 1.7 |
| Theoretical active life (days) | 113 | 167 | 106 | 129 |

This test accordingly illustrates the efficiency of the anti-fouling paints prepared in the manner as described in Examples 2 to 5. It is to be noted that this efficiency was obtained with a speed of release of toxic substance, in respect of the composition of Examples 3 and 5, much lower than the speeds of release which are necessary in the case of the known anti-fouling paints, in which the toxic substance is also selected from TBTO and TBTA, namely, at least 4 micrograms of tin/cm$^2$/day.

EXAMPLE 6

As Example 2, but using tributyl-tin fluoride (TBTF) in methanol at 50° C. as toxic substance.

The proportion of albumin gel incorporated into the paint composition was 40% by weight.

The total quantity of TBTF in the paint film after the latter has been formed was 20% by weight.

EXAMPLE 7

As Example 2, but using triphenyl-tin fluoride (TPhTF) as toxic substance.

The proportion of albumin gel was 45% by weight of the paint after the film has been formed and the quantity of TPhTF 20% by weight of the paint.

EXAMPLE 8

As Example 2 but, after having reduced the albumin gel to powder, the powder obtained was washed with a mixture comprising equal volumes of water and methanol in order to eliminate the fraction of TBTO liberated from the albumin gel at the time of the crushing or grinding operation.

An anti-fouling paint was obtained which was practically free from any toxicity while it is being stored, handled and applied.

What is claimed is:

1. In an anti-fouling paint for application to structures immersed in sea water to inhibit attachment of marine organisms to the structures, the paint containing a vehicle comprising a film-forming resin, solvent and a toxic substance; the improvement comprising, as said toxic substance, cuprous oxide or an organic tin compound uniformly dispersed in a discontinuous solid matrix selected from the group consisting of coagulated albumin and regenerated cellulose in the form of a gel, said matrix being insoluble in sea water having no marine organisms or bacterial film, and which becomes soluble in sea water only after being contacted by enzymes produced by the marine organisms and/or the bacterial film, whereby said matrix dissolves and releases said toxic substance only in the presence of the marine organisms and/or the bacterial film.

2. Anti-fouling paint according to claim 1, wherein the matrix includes a gel of regenerated cellulose.

3. Anti-fouling paint according to claim 1, wherein the matrix is in the form of powder particles having a grain size not greater than 100 microns.

4. Anti-fouling paint according to claim 1, wherein said cuprous oxide or organic tin compound is from 5 to 50% by weight of the matrix and cuprous oxide or organic tin compound.

5. Anti-fouling paint according to claim 1, wherein the mixture of matrix and toxic substance is in the ratio of from 20 to 60 parts by weight to 100 parts by weight of paint.

* * * * *